UNITED STATES PATENT OFFICE 2,230,965

PROCESS OF PREPARING GUANYL TAURINE

Henry Philip Orem, North Plainfield, N. J., assignor to American Cyanamid Company, New York, N. Y., a corporation of Maine No Drawing. Application June 14, 1940,
Serial No. 340,536

9 Claims. (Cl. 260—513)

This invention relates to a new and improved method for the production of guanyl taurine (2-guanidyl-ethane-1-sulfonic acid).

Guanyl taurine is of considerable importance as a material for producing stabilized diazo compounds which do not couple under alkaline conditions. In the past it has been prepared by a reaction of taurine and cyanamide in aqueous solution. This method is inconvenient and costly because the cyanamide is rather unstable and an additional step of evaporation of the water is required.

According to the present invention guanyl taurine is obtained by reacting taurine with dicyandiamide in the molten state. This reaction produces almost theoretical yields of guanyl taurine which is quite surprising because dicyandiamide is known to react with many amino compounds to produce biguanidyl derivatives. In the present case, however, guanyl taurine is produced without substantial contamination with biguanidyl derivatives.

The reaction on which the present invention is based can be represented as follows:

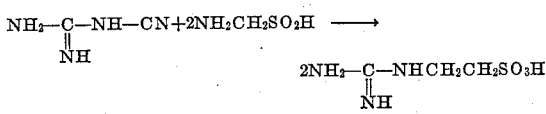

It will be noted that it requires two moles of taurine to one mole of dicyandiamide. The reaction is not sensitive to an excess of dicyandiamide, in fact a slight excess over the theoretical quantity is preferable.

The present process produces a substantially anhydrous product conveniently and easily and requires no costly removal of water which is one of the serious drawbacks to the regular process employing cyanamide in aqueous solution.

The reaction of the present invention may be carried out simply by heating an intimate mixture of the reaction components in a dry state, preferably obtained by grinding them together, until a melt is obtained which on further heating solidifies as the reaction proceeds. This gives directly guanyl taurine without contamination with other materials and is the preferred method of the present invention. However, where it is desired, the reaction may take place in the presence of an inert organic diluent of sufficiently high boiling point such as for example, nitrobenzene, ortho dichlorobenzene and the like, or in the presence of organic diluents of lower boiling points such as xylene or mono-chlorobenzene where sufficient pressure is used to prevent loss of diluent by evaporation.

The temperature of the reaction of the present invention is not critical. In general the temperature should not be below 160° C. as the reaction does not proceed readily below this temperature. Higher temperatures can be used up to the decomposition temperatures of the reactants and for best results and rapid reaction, I prefer to use somewhat higher temperatures, the range 180°–210° C. giving the best results.

The invention will be described in greater detail in conjunction with the following specific examples which are illustrative only, the invention not being limited to the particular details therein set forth. The parts are by weight.

Example 1

282.5 parts of taurine are intimately mixed with 114 parts of dicyandiamide by grinding. The mixture so obtained is then slowly heated to 190°–200° C. whereupon a smooth melt is obtained. The temperature is maintained within these limits until solidification occurs. After solidification, the reaction mixture is heated an additional hour at this temperature. After cooling, the product is ground to yield a white powder soluble in water.

The product may be purified, yielding analytically pure material, by solution in water and precipitation of the guanyl taurine through dilution with alcohol.

Example 2

125 parts of taurine, 46 parts of dicyandiamide and 1,000 parts of nitrobenzene are heated with stirring for two hours at 190° C. and then for one hour at 200°–210° C. Two liquid layers are formed. After cooling, the lower guanyl taurine layer solidifies. The nitrobenzene is drained off and the reaction product is dissolved in water, the water solution is clarified by filtration and the guanyl taurine is precipitated through addition of alcohol.

When an equivalent weight of ortho dichlorobenzene is substituted for the nitrobenzene employed in Example 2, a similar result is obtained.

What I claim is:

1. A method of preparing guanyl taurine which comprises bringing about the reaction of taurine and dicyandiamide at a temperature between 160° C. and the decomposition temperature of the reactants.

2. A method according to claim 1 in which the temperature is 180°–210° C.

3. A method of preparing guanyl taurine which comprises bringing about the reaction between taurine and dicyandiamide in the proportion of approximately 1 molecular equivalent of dicyandiamide to two molecular equivalents of taurine at a temperature between 160° C. and the decomposition temperature of the reactants.

4. A method according to claim 3 in which the temperature is 180°–210° C.

5. A method of preparing guanyl taurine which comprises bringing about the reaction between taurine and dicyandiamide in the proportion of slightly in excess of 1 molecular equivalent of dicyandiamide to 2 molecular equivalents of taurine at a temperature between 160° C. and the decomposition temperature of the reactants.

6. A method according to claim 5 in which the temperature is 180°–210° C.

7. A method of preparing guanyl taurine which comprises heating a dry mixture of approximately one molecular equivalent of dicyandiamide and two molecular equivalents of taurine at a temperature between 160° C. and the decomposition temperature of the reactants.

8. A method according to claim 7 in which the temperature is 180°–210° C.

9. A method of preparing guanyl taurine which comprises heating a dry mixture of approximately 1 molecular equivalent of dicyandiamide and 2 molecular equivalents of taurine at a temperature between 180°–210° C. until the reaction is complete, dissolving the reaction product in water and precipitating it by the addition of alcohol.

HENRY PHILIP OREM.

CERTIFICATE OF CORRECTION.

Patent No. 2,230,965. February 4, 1941.

HENRY PHILIP OREM.

It is hereby certified that error appears in the printed specification of the above numbered patent requiring correction as follows: Page 1, first column, line 26, in the formula, for "$2NH_2CH_2SO_2H$" read --$2NH_2CH_2CH_2SO_3H$--; and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.